June 16, 1942.  H. A. ROBINSON  2,286,379
PURIFICATION OF ETHYL CHLORIDE
Filed May 1, 1941
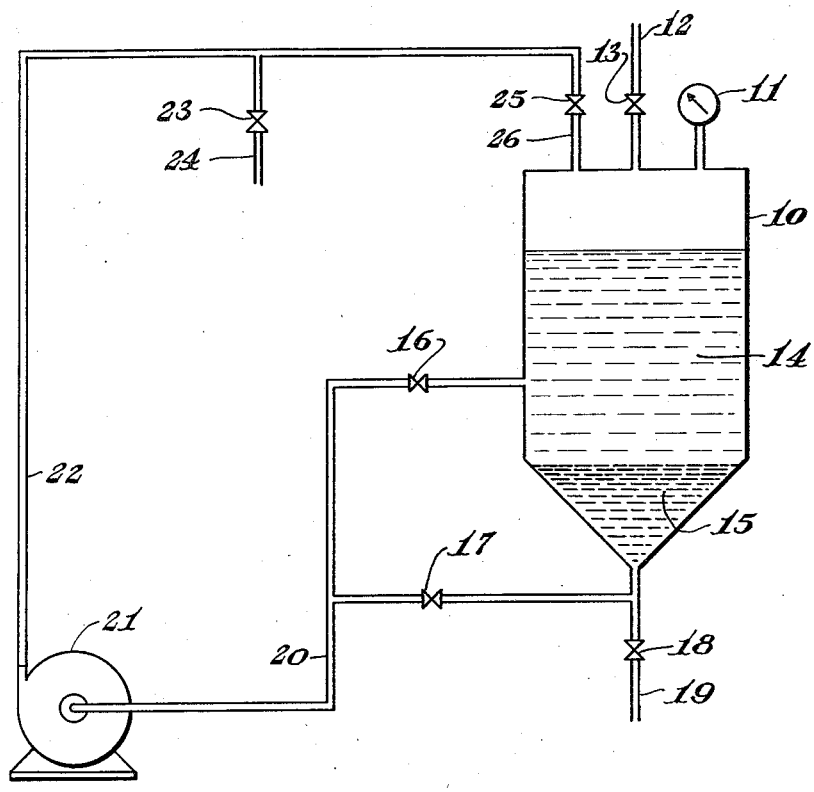
INVENTOR
Harold A. Robinson
BY
Griswold & Burdick
ATTORNEYS Patented June 16, 1942

2,286,379

UNITED STATES PATENT OFFICE 2,286,379

PURIFICATION OF ETHYL CHLORIDE

Harold A. Robinson, Midland, Mich., assignor to The Dow Chemical Company, Midland, Mich., a corporation of Michigan Application May 1, 1941, Serial No. 391,288

5 Claims. (Cl. 260—652)

This invention relates to the purification of ethyl chloride. It relates in particular to a method whereby compounds containing a triple bond may be removed from ethyl chloride which has been produced by the reaction of impure ethylene and hydrogen chloride. It relates further to a method of minimizing the sulfur content of such an ethyl chloride.

A major portion of the ethyl chloride now being produced is made by an addition reaction between hydrogen chloride and ethylene. The commonest commercial source of ethylene for this and related industrial manufacturers is cracked petroleum fractions or cracked natural gas. The product obtained by cracking such mineral hydrocarbons includes not only ethylene and other olefines, but also compounds, such as acetylene, which contain a triple bond. Another occasional type of impurity is carbon disulfide and other sulfur compounds, often unidentified. Since it has been almost impossible to isolate pure ethylene from such mixtures, the ethyl chloride obtained therefrom contains as impurities some triple bond compounds, occasionally some other unsaturates, and, in some instances, some unidentified sulfur compounds. These impurities cannot be separated readily from the ethyl chloride product by any of the usual methods, such as distillation, and some of them give the product a foreign odor. For some uses of ethyl chloride the above-suggested impurities are not objectionable in the quantities in which they occur, but in other uses, as for example, the manufacture of ethyl cellulose, or for use in some alkylation reactions, it is desired to employ as pure a grade of ethyl chloride as possible. Further, the consuming trade requires about as high purity in the newer and less expensive ethyl chloride as that to which it became accustomed when using ethyl chloride made from pure grain alcohol.

The present invention has for its object the provision of a method of purifying ethyl chloride (prepared by the addition reaction of impure ethylene and hydrogen chloride) to remove compounds containing triple bonds, and other unsaturates. Another object is to provide a method as aforesaid, whereby sulfur compounds may be removed, or their concentration in ethyl chloride materially reduced. Other and related objects may appear hereinafter.

According to the invention, the foregoing and related objects may be attained by agitating together in intimate physical contact, and under sufficient pressure to keep the ethyl chloride liquid at the temperature employed, the ethyl chloride to be purified and a neutral or slightly alkaline aqueous solution of potassium permanganate, preferably containing as well, potassium dichromate, until the permanganate is no longer reduced by the unsaturates present, settling the spent permanganate solution, and decanting the ethyl chloride, which may then be distilled or it may be treated further, prior to distillation, with an aqueous alkaline solution of hydrogen peroxide to oxidize and to extract sulfur compounds from the ethyl chloride, presumably as sulfates.

A preferred mode of operation will be explained with respect to the accompanying drawing forming a part hereof, wherein the single figure is a diagrammatic representation of an apparatus suitable for carrying out the steps of the invention.

An iron pressure vessel 10, fitted with pressure gauge 11, is washed on its inner surface with an aqueous solution of potassium or sodium dichromate to "pacify" the iron, i. e., to repress its tendency to reduce potassium permanganate solutions and to alter their pH. The dichromate solution is left in the system. There is then added, suitably through inlet pipe 12, by way of valve 13, a supply of ethyl chloride 14 to be purified. A neutral or slightly alkaline aqueous solution of potassium permangante is added through inlet 12, and the system is prepared for circulation and agitation of the reactants, by closing valve 13, and opening valves 16 and 17. Circulation of the liquids in the system is effected by means of centrifugal pump 21 which withdraws ethyl chloride 14 and mixed permanganate-dichromate solution 15 from tank 10, in a proportion which may be adjusted by means of valves 16 and 17. The liquids are withdrawn through line 20 and are returned to the tank through lines 22 and 26, the operation being continued until the permanganate is reduced, or until no further reduction occurs, as may be determined by the condition and analysis of samples periodically withdrawn through sampling valve 23 on pipe 24. Additional amounts of permanganate solution may be added to replace that which is reduced during the reaction, until such time as no further reduction is obtained. The pump 21 is then stopped, valves 16, 17, and 25 are closed, and the two-phase liquid system is allowed to stand, whereupon it separates into its respective layers 14 and 15. The aqueous solution may be withdrawn from tank 10 through valve 18 and outlet 19. The treatment removes unsaturates, including acetylene.

If desired, some undesirable sulfur compounds may now be removed from the ethyl chloride by introducing an alkaline solution of hydrogen peroxide, and again circulating the two-phase liquid system to provide agitation and intimate contact between the components of the respective phases. Again, after reaction is complete, the phases may be separated, and the aqueous layer withdrawn through drain pipe 19.

The ethyl chloride may be removed from the vessel 10 through pipe 19 and may be dried, suitably by being filtered through a bed of caustic soda in lump, pellet, or flake form. It may be used as thus-obtained, or the ethyl chloride may be distilled prior to use, if desired.

The dichromate solution, containing spent permanganate may be returned to the reaction vessel 10, after separation of $MnO_2$ "mud," and additional permanganate may be dissolved therein. The dichromate is not affected by the reaction except as it picks up carbonates resulting from oxidation of acetylene or like impurities in the ethyl chloride. The dichromate may be used for several batch treatments, until it becomes strongly alkaline, when it may be restored to its effective condition by careful neutralization with acid to liberate carbon dioxide from the dissolved carbonate.

In the specific example, ethyl chloride is to be purified having an initial content of triple bond unsaturates, calculated as acetylene, of 0.069 per cent (690 parts per million) and a content of sulfur compounds, reported as sulfur, of 0.013 per cent (130 parts per million). An apparatus is set up like that in the drawing. Four liters of a 5 per cent solution of potassium dichromate in water is charged into the system and circulated by means of the pump, to protect and "pacify" the iron surfaces in the tank, pump, and lines. About 100 pounds, (50 liters) of the crude ethyl chloride is charged into the system, under pressure. Normal aqueous potassium permanganate solution is added portionwise, from 1 to 3 liters at a time, and the total liquid contents of the system are circulated as above-described, at a temperature of 20° to 30° C. and a corresponding pressure of 10 to 30 pounds per square inch, until a sample removed through valve 23 shows no permanganate stain on filter paper, indicating complete reduction of the permanganate. Additional amounts of normal permanganate solution are introduced and circulation continued until the permanganate is no longer reduced within a period of 5 to 10 minutes. In all, a slight excess over the theoretical permanganate is added, the total being 16 liters of normal solution. Circulation is stopped, and after allowing about 1 hour for the layers to separate within the vessel, the spent permanganate and dichromate solution is removed through drain pipe 19. A sample of the ethyl chloride now is found to contain less than 0.0001 per cent (1 part per million) of triple bond unsaturates calculated as acetylene, but still contains 0.012 per cent (120 parts per million) of sulfur.

To the main body of ethyl chloride remaining in the reaction vessel is added more than the theoretical amount of a 3 per cent solution of hydrogen peroxide in normal sodium hydroxide, and the mixture is circulated as before. The sulfate content of the water layer gradually increases and the sulfur content of the ethyl chloride decreases. When equilibrium conditions are obtained, there still being an excess of hydrogen peroxide, circulation is stopped, and the two layers are separated. The total sulfur content is reduced about 60 per cent to a value of about 0.005 per cent (50 parts per million), and it is found that all remaining sulfur compounds are substantially free from carbon-to-sulfur double bonds, such groupings having been oxidized during the purification to a form soluble in the aqueous alkali.

The so-purified ethyl chloride is dried by filtration through a bed of flaked sodium hydroxide, and is found to meet the most critical requirements of industry.

The dichromate-spent permanganate solution, withdrawn from the reaction vessel after the acetylene removal, is decanted or filtered away from the $MnO_2$ "mud," and is made up to suitable reaction condition by dissolving potassium permanganate therein.

During the course of the acetylene removal reaction, it is observed that there is a very rapid reduction in the amount of acetylene (or other triple bond compounds) down to a value of about 100 parts per million. Until this value is reached, the permanganate is reduced practically as fast as it is added to the reaction zone, but further reduction of the acetylene content to about 1 part per million may require from ½ to 4 hours or more, depending on the amount of material being treated, the efficiency of the agitation system employed, and the temperature of the reaction mixture. Temperatures are generally preferred between 10° and 30° C., under the corresponding pressure of the mixture. Lower temperatures, down to the freezing point of the aqueous treating media, may be employed, if desired, as may somewhat higher temperatures, up to the practical pressure limit of the circulating system. For most convenient operation, the conditions above suggested have been found satisfactory. When operating in glass or enameled vessels, or in any apparatus whereof the material is not a reducing agent for permanganate solutions, the dichromate solution need not be employed to protect the system, but still is found to be advantageous, apparently to buffer the permanganate or to perform some similar function to retard change in pH.

If desired, the permanganate solution employed may contain small amounts of wetting agents such as the sulfated higher alcohols, to increase the reaction rate by improving contact between the ethyl chloride and the permanganate, but this may cause formation of emulsions in the system which are hard to break, and often it is found that the wetting agent dissolves somewhat in the ethyl chloride, thereby introducing a "non-volatile residue" into its distillation curve.

The method has been described with respect to the use of potassium permanganate and potassium dichromate in the acetylene removal step. It is to be understood that other permanganates and other dichromates, soluble in water or in dilute alkalies, may be employed. These include, for example, the sodium, calcium, and magnesium permanganates, and the sodium and calcium dichromates. The reagents should be used in neutral or slightly alkaline aqueous solution. The pH may be as high as 13, but the alkali concentration should preferably be kept below about 2.5 normal, to avoid as much as possible any saponification of the ethyl chloride, The method of the invention has, among others, the following advantages over other proposed methods of purifying ethyl chloride. The halogens have been proposed as reactants to remove acetylene, but they either react too slowly, or they react explosively with the acetylene, or they halogenate the ethyl chloride, depending on the conditions employed and the amount of impurity present. The present invention proceeds smoothly and without violence. The heavy metal salts, such as those of lead, copper, mercury, or silver, which have been proposed as reagents to remove acetylene, form metal acetylides, which may be explosive. The present process involves no such hazard.

I claim:

1. The method of removing acetylene and other triple bond unsaturates from ethyl chloride, which comprises bringing ethyl chloride containing such impurities into intimate physical contact with an aqueous solution of a water-soluble permanganate at a pH between 7 and 13, said solution being from 0 to 2.5 normal with a water-soluble alkali, until the reduction of permanganate ceases, and separating the spent permanganate liquor from the so-purified ethyl chloride.

2. The method of removing acetylene and other triple bond unsaturates from ethyl chloride, which comprises bringing ethyl chloride containing such impurities into intimate physical contact with an aqueous solution of a water-soluble permanganate at a pH between 7 and 13, said solution being from 0 to 2.5 normal with a water-soluble alkali, in a closed system at a temperature between 10° and 30° C. and under the corresponding vapor pressure of the mixture, until the reduction of permanganate ceases, and separating the spent permanganate liquor from the so-purified ethyl chloride.

3. The method of removing acetylene and other triple bond unsaturates from ethyl chloride, which comprises bringing ethyl chloride containing such impurities into intimate physical contact, in a closed system substantially inert to the reagents employed, with an excess over the theoretical amount of an aqueous solution of potassium permanganate at a pH between 7 and 13, said solution being from 0 to 2.5 normal with a water-soluble alkali, agitating the mixture at a temperature between 10° and 30° C. and under the corresponding vapor pressure of the mixture, at least until the reduction of the permanganate ceases, and separating spent permanganate liquor from the so-purified ethyl chloride.

4. The method of removing acetylene and other triple bond unsaturates from ethyl chloride, which comprises bringing ethyl chloride containing such impurities into intimate physical contact, in a closed iron system substantially inert to the reagents employed, with an excess over the theoretical amount of an aqueous solution of potassium permanganate at a pH between 7 and 13, said solution being from 0 to 2.5 normal with a water-soluble alkali and containing a water-soluble dichromate in amount sufficient to pacify the iron, agitating the mixture at a temperature between 10° and 30° C. and under the corresponding vapor pressure of the mixture, at least until the reduction of the permanganate ceases, and separating the dichromate and spent permanganate liquor from the so-purified ethyl chloride.

5. The method of removing acetylene and other triple bond unsaturates, and compounds containing carbon-to-sulfur double bonds from ethyl chloride, which comprises bringing ethyl chloride containing such impurities into intimate physical contact with an aqueous solution of a water-soluble permanganate at a pH between 7 and 13, said solution being from 0 to 2.5 normal with a water-soluble alkali, until the reduction of permanganate ceases, separating the spent permanganate liquor from the so-treated ethyl chloride, then bringing this ethyl chloride into intimate physical contact with an aqueous alkaline solution of hydrogen peroxide until the sulfate content of the aqueous phase no longer increases, and separating the aqueous layer from the so-purified ethyl chloride.

HAROLD A. ROBINSON.